United States Patent
Shih et al.

(10) Patent No.: US 7,346,215 B2
(45) Date of Patent: Mar. 18, 2008

(54) APPARATUS AND METHOD FOR CAPTURING A DOCUMENT

(75) Inventors: Chen-Hsiang Shih, Chang-Hua (TW); Yin-Chun Huang, Hsin-Chu (TW)

(73) Assignee: Transpacific IP, Ltd., Taipei (TW)

( * ) Notice: Subject to any disclaimer, the term of this patent is extended or adjusted under 35 U.S.C. 154(b) by 846 days.

(21) Appl. No.: 10/029,846

(22) Filed: Dec. 31, 2001

(65) Prior Publication Data

US 2003/0123113 A1    Jul. 3, 2003

(51) Int. Cl.
*G06K 9/36*    (2006.01)
(52) U.S. Cl. .................. 382/232; 382/235; 382/244; 358/448; 358/453; 358/539
(58) Field of Classification Search .............. 358/1.13, 358/448, 453, 539; 382/232, 235, 244
See application file for complete search history.

(56) References Cited

U.S. PATENT DOCUMENTS

| | | | | |
|---|---|---|---|---|
| 5,828,780 A * | 10/1998 | Suzuki et al. | .............. | 382/167 |
| 5,966,468 A * | 10/1999 | Fujimoto | .................. | 382/239 |
| 5,991,515 A * | 11/1999 | Fall et al. | ................ | 358/1.15 |
| 6,097,845 A | 8/2000 | Ng et al. | .................... | 382/239 |
| 6,144,772 A * | 11/2000 | Garland et al. | ............ | 382/239 |
| 6,269,190 B1 * | 7/2001 | Mikkelsen et al. | ........ | 382/232 |
| 6,512,856 B1 * | 1/2003 | Davis | ........................ | 382/284 |
| 6,646,765 B1 * | 11/2003 | Barker et al. | ............... | 358/474 |
| 6,700,685 B1 * | 3/2004 | Matama | ...................... | 358/487 |
| 6,735,740 B2 * | 5/2004 | Sakai et al. | ................. | 715/526 |
| 6,804,401 B2 * | 10/2004 | Nelson et al. | ............. | 382/239 |
| 2002/0012126 A1 * | 1/2002 | Nakamura | .................. | 358/1.9 |

* cited by examiner

*Primary Examiner*—Twyler Lamb
*Assistant Examiner*—Vu Hang
(74) *Attorney, Agent, or Firm*—Stolowitz Ford Cowger LLP

(57) ABSTRACT

An apparatus for capturing a document with a plurality of compression models comprises an image-processing system and an image-capturing system. The image-processing system is for accepting a request of setting the compression models for the document and processing the data of the document according to the compression models, wherein the request is from an exterior electric device connected to the apparatus. The image-capturing system is for capturing the data of the document, and is connected to the image-processing system and comprises multitudes of optic devices. The method for capturing the document with these compression models comprises accepting a request of setting the compression models for the document; capturing the data of the document; and processing the data of the document with these compression models.

18 Claims, 2 Drawing Sheets

APPARATUS AND METHOD FOR CAPTURING A DOCUMENT

BACKGROUND OF THE INVENTION

1. Field of the Invention

The invention relates to an image-capturing apparatus and method, and more particularly relates to an image-capturing system and method with compression technologies.

2. Description of the Prior Art

Most computer systems use a form of raster image to output image data to a visual output device such as a cathode ray tube (CRT) monitor, liquid crystal display (LCD), or a printer such as a color laser copier. A raster image is represented as a series of scan lines of pixels, wherein each pixel is accessed in a sequential manner, and each scan line is processed. An area to which image data may be output sequentially by the visual output device is referred to as a page. The image data of a page provides its complete visual representation.

Interpreters of page description languages typically process images in one or both of two modes: band mode and frame mode. Both of these however generally require a buffer memory which can hold the entire visual representation of a page, it is desirable to reduce the buffer memory requirements, for example by using some form of compression. In general apparatus of image-capture, such as a scanner, there are two models in a technology of compression. "Loss-less" is one that image data captured by the scanner is decompressed without distortion, while "Lossy" is one that the image data is distorted after decompression. One compression method is shown in U.S. Pat. No. 6,269,190 to Mikkelsen et al. related to processes and apparatus for processing image data. A page of an image is divided into several regions. Each of these regions may be compressed according to a different technique according to the kind of data within the region. Each region can be compressed with a method that works well for the data contained in that region.

Another compression method is shown in U.S. Pat. No. 6,097,845 to Ng et al. It is for discriminating among image characteristics in order to select among a plurality of compression techniques. Multiple compression schemes are applied to a source image concurrently and the results are stored. Image discrimination is performed in parallel with the image compression to generate a recommendation regarding the stored compressed images.

SUMMARY OF THE INVENTION

It is a principal object of the present invention to provide a system and method of image capture. Users can determine a captured image coordinated with settings of various compression models. Thus, the capture rate speeds up as well as the captured image isn't distorted.

It is another object of the present invention to provide a method of scanning applied on a scanner. A scanned object can be divided into various zones with various compression ratios set by users.

In the present invention, an apparatus for capturing a document with a plurality of compression models comprises an image-processing system and an image-capturing system. The image-processing system is for accepting a request of setting the compression models for the document and processing the data of the document according to the compression models, wherein the request is from an exterior electric device connected to the apparatus. The image-capturing system is for capturing the data of the document, and is connected to the image-processing system and comprises multitudes of optic devices. The method for capturing the document with these compression models comprises accepting a request of setting the compression models for the document; capturing the data of the document; and processing the data of the document with these compression models.

BRIEF DESCRIPTION OF THE DRAWINGS

A better understanding of the invention may be derived by reading the following detailed description with reference to the accompanying drawings wherein.

DESCRIPTION OF THE PREFERRED EMBODIMENT

While the invention is described in terms of a single preferred embodiment, those skilled in the art will recognize that many devices described below can be altered as well as other substitutions with same function and can be freely made without departing from the spirit and scope of the invention.

Furthermore, the drawings are not necessarily to scale for clarify of illustration and should not be interpreted in a limiting sense. Furthermore, the present invention can be applied on other image-capturing apparatus without limitation of a scanner in the present invention.

In the present invention, a capturing system for capturing a document with a plurality of compression models comprises computer-readable programs, an processing system, and a scanning system. The computer-readable programs are stored in a computer connected to said capturing system and used for providing a display interface for assigning the compression models to the zones on the document. The processing system is for accepting a request of setting the compression models for the document and processing the data of the document according to the compression models. The request is from the computer-readable programs. The scanning system is connected to the processing system and used for capturing the data of the document and transferring the data to the processing system. The method for capturing the document with these compression models comprises accepting a request of setting the compression models for the document; capturing the data of the document; and processing the data of the document with these compression models.

Figure 1:
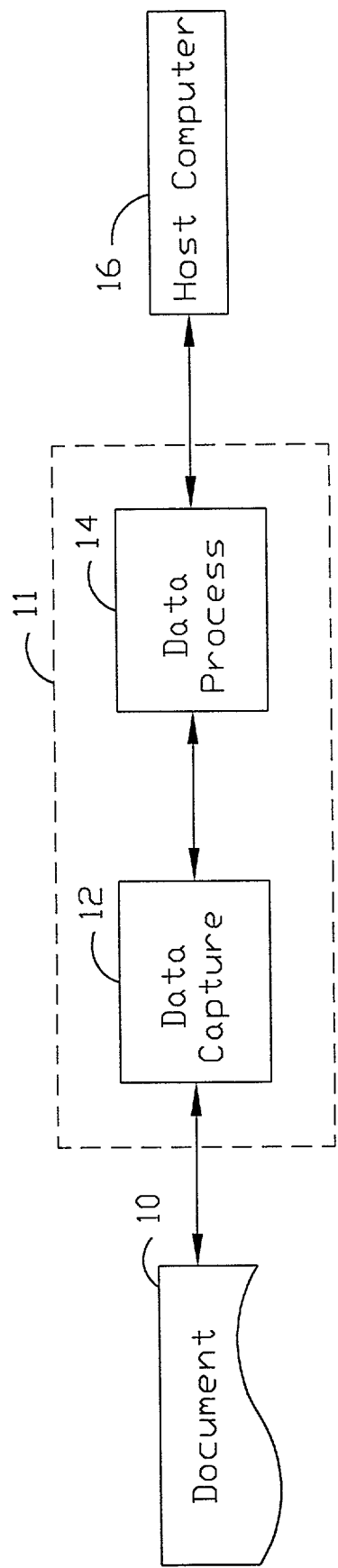
FIG. 1 is a block diagram of an image-capturing system 11 for practicing the present invention.

Referring now to FIG. 1, there is shown a block diagram of an image-capturing system for practicing the present invention. The image-capturing system 11 may be implemented as functional components within a scanning system, and may take the form of hardware or software, or some combination thereof. In one embodiment, the components of FIG. 1 may be implemented in any hardware platform suitable for a scanning system. For example, there are a data capture part 12 and a data process part 14 in the image-capturing system 11. The data capture part 12, such as optical devices and the related peripheral apparatus or circuits, is responsible to capture the raw data of a document 10 when the document 10 is scanned by the image-capturing system 11. The document 10 is typically a paper document containing a source image of some kind. The source image may be primarily grayscale, such as a photograph, or primarily bitonal, such as text. Alternatively, the source image is a more complex image type incorporating both grayscale and bitonal components.

In such cases, the data process part 14, such as microprocessor and related peripheral devices and circuits, is responsible for processing the raw data and executing various types of compression for the raw data. For example, color compression may be used, in which case an analysis of chrominance and luminance components might be performed in order to provide recommendations among various color and non-color compression schemes. Next, the data process part 14 outputs the processed image data to a host computer 16 for further data processing.

In one embodiment of the present invention, the data process part 14 can provides users to select various compression models, such as "Loss-less" and "Lossy", for a single document 10 through the host computer 16. For example, users can select "Loss-less" compression model for the source image of the document 10 on consideration of non-distortion. The "Loss-less" compression model processes the image data with the lower ratio of compression, which doesn't result in distortion through decompression by the host computer 16. On the other hand, users select "Lossy" compression model for the other inferior parts of the document 10 on consideration of the less capacity of data. The "Lossy" compression model processes the image data with the higher ratio of compression, which may reduce the capacity of the image data and speed up the scanning process.

Figure 2:
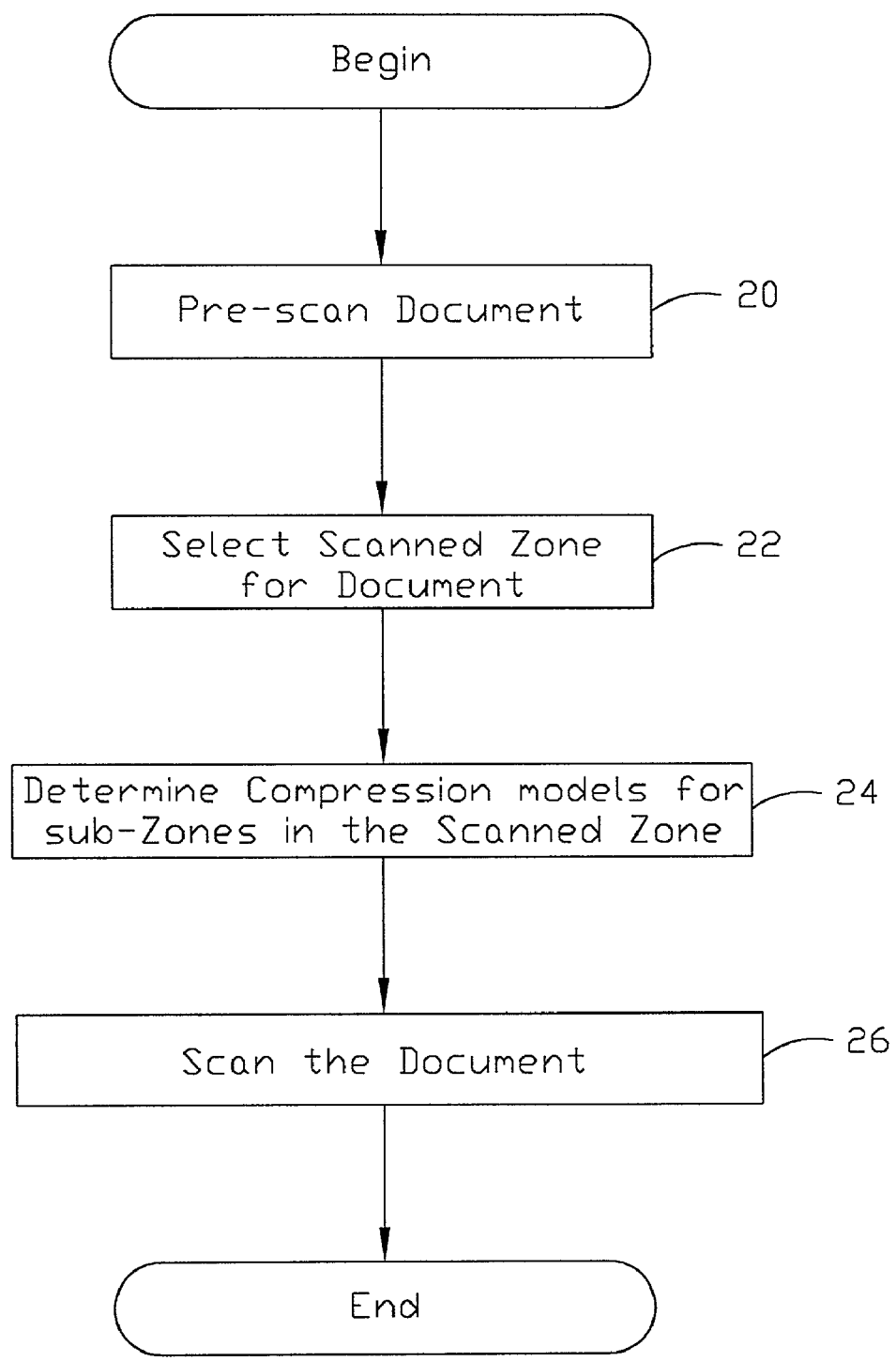
FIG. 2 is a schematic diagram illustrating the flow chart in accordance with the present invention.

FIG. 2 is a schematic diagram illustrating the flow chart in accordance with the present invention. First, pre-scanning of a document is performed by the scanner with default settings (step 20) in order to perform classification of the document. Users can view the pre-scanned image on a display screen with any image software in the host computer. Next, users would select a scanned zone for the document they want through the tools provided by the image software (step 22). As one of key features of the present invention, users can further determine one or more "Loss-less" zones and "Lossy" zones on the selected scanned zone (step 24). In the present invention, the geometric shapes of the "Loss-less" or "Lossy" zones can be arbitrary, dependent on the users and the tools provided by the image software. Then the formal scanning of the document is implemented by the scanner according to the users' settings through the host computer (step 26).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus comprising:
an image-processing component adapted to generate data to display a preliminary scanned image of a document, and further adapted to receive a selection of a scanning zone of the preliminary scanned image, wherein the scanning zone comprises less than the entire preliminary scanned image, and further adapted to receive a selection of at least one sub-zone of the scanning zone and a selection of one of a plurality of compression models for the at least one sub-zone, wherein selection of a sub-zone comprises designation of an arbitrary area of the scanning zone, and wherein the selected compression model defines at least one compression ratio; and
an image-capturing component adapted to scan said document in accordance with the received selection of a scanning zone, and further adapted to process a scanned image in accordance with the received selection of at least one sub-zone and received selection of one of a plurality of compression models.

2. The apparatus of claim 1, wherein said image-processing component is further adapted to receive a selection of at least one sub-zone based at least in part on a request from an exterior device.

3. The apparatus of claim 1, wherein said apparatus comprises a scanner.

4. The apparatus of claim 3, wherein said compression model defines differing compression configurations for at least two portions of the image.

5. A system comprising:
a display interface adapted to display a preliminary scanned document image;
a processing device for accepting a scanning zone selection, wherein the scanning zone comprises less than the entire document image, and further adapted to accept a selection of at least one sub-zone of the scanning zone selection, wherein the selection of a sub-zone comprises designation of an arbitrary area of the scanning zone, and wherein selection of a sub-zone further comprises designation of a compression setting for the sub-zone, wherein the compression setting comprises one or more compression ratios for the sub-zone; and
a scanning device coupled to said processing device, said scanning device adapted to capture a document image in accordance with the received selection of a scanning zone, and further adapted to provide the captured document image to the processing device for processing in accordance with the received selection of a sub-zone.

6. The system of claim 5, wherein said scanning system comprises a plurality of photo sensors.

7. The system of claim 5, wherein said processing is further configured to output said captured document image to an external device.

8. A method comprising:
pre-scanning an object to obtain a preliminary scanned image including a scanning zone;
providing scanning zone data to a computing system adapted to perform a chrominance and luminance analysis of at least a portion of the scanning zone; and
displaying a plurality of user-selectable sub-zones each having a plurality of user-selectable compression ratios, wherein the sub-zones and compression ratios are determined based at least in part on chrominance and luminance date provided by the computing system.

9. The method of claim 8, further comprising receiving user selection of a user-selectable sub-zones by use of an editing tool.

10. The method of claim 8, wherein said pre-scanning is implemented by a plurality of optic devices.

11. The method of claim 8, and further comprising displaying said plurality of user-selectable sub-zones on a display device.

12. The method of claim 8, wherein said plurality of compression ratios comprise lossy and lossless compression ratios.

13. An apparatus, comprising:
means for providing a preliminary scanned image of a document;
means for selecting a scanning zone of the document based on the preliminary scanned image, wherein the scanning zone comprises less than the entire document;
means for selecting at least one sub-zone of the scanning zone, wherein means for selecting at least one subzone comprises means for designation of an arbitrary area of the scanning zone, and wherein means for selecting a sub-zone further comprises designation of at least one compression ratio for the sub-zone; and
means for scanning the document in accordance with the selected scanning zone and selected at least one sub-zone.

14. The apparatus of claim 13, further comprising means for displaying said preliminary scanned image.

15. The apparatus of claim 14, wherein means for selecting a scanning zone comprises means for selecting a region of the preliminary scanned image from said means for displaying said preliminary scanned image.

16. The apparatus of claim 13, further comprising means for providing said scanned document to an external device.

17. The apparatus of claim 13, wherein means for providing a preliminary scanned image comprises means for displaying one or more user-selectable scan zones.

18. The apparatus of claim 13, wherein means for selecting at least one sub-zone comprises means for selecting a combination of lossy and lossless compression ratios for the at least one sub-zone.

* * * * *

UNITED STATES PATENT AND TRADEMARK OFFICE
CERTIFICATE OF CORRECTION

PATENT NO.       : 7,346,215 B2                                             Page 1 of 1
APPLICATION NO.  : 10/029846
DATED            : March 18, 2008
INVENTOR(S)      : Shih et al.

It is certified that error appears in the above-identified patent and that said Letters Patent is hereby corrected as shown below:

At column 4, line 55, please replace "luminance date" with --luminance data--.
At column 5, line 8, please replace "least one subzone" with --least one sub-zone--.

Signed and Sealed this

First Day of September, 2009

David J. Kappos
*Director of the United States Patent and Trademark Office*